Dec. 31, 1963  S. L. WHITLOW  3,116,083
KNOCKDOWN BUMPER ASSEMBLY FOR TRACTORS
Filed July 11, 1960

INVENTOR
S. L. Whitlow

BY Wilkinson, Mawhinney & Theibault
ATTORNEY

United States Patent Office 3,116,083
Patented Dec. 31, 1963

3,116,083
KNOCKDOWN BUMPER ASSEMBLY FOR TRACTORS
Stacey L. Whitlow, R.F.D., Keysville, Va.
Filed July 11, 1960, Ser. No. 41,836
1 Claim. (Cl. 293—70)

The present invention relates to knockdown bumper assembly for tractors and has for an object to provide a bumper assembly for the Farmall type tractor which is sold without a bumper.

Another object of the present invention is to provide a novel form of bumper construction which may be readily shipped in a knockdown compact condition to users of a Farmall type tractor and which may be assembled by the tractor operator without requiring such special equipment as welding apparatus and which structure is susceptible of compact nesting for shipment. The welded type construction is bulky and would result in too large a shipping container or would require welding equipment at the site of installation.

In going through fields foreign objects are often struck by the tractor which will cause a bending of the front axle or a dishing in of the radiator or other injury to the tractor which means a loss of time in the field.

A further object of the present invention is to provide a knockdown bumper assembly which may be installed at the site and which by virtue of its angle iron construction with its top flange positioned at the front top portion of the bumper assembly will also provide a stabilizing platform for the addition of weight for counterbalancing the tractor when the tractor is carrying heavy loads in the rear.

With the foregoing and other objects in view, the invention will be more fully described hereinafter, and will be more particularly pointed out in the claim appended hereto.

In the drawings, wherein like symbols refer to like or corresponding parts throughout the several views.

Figure 1:
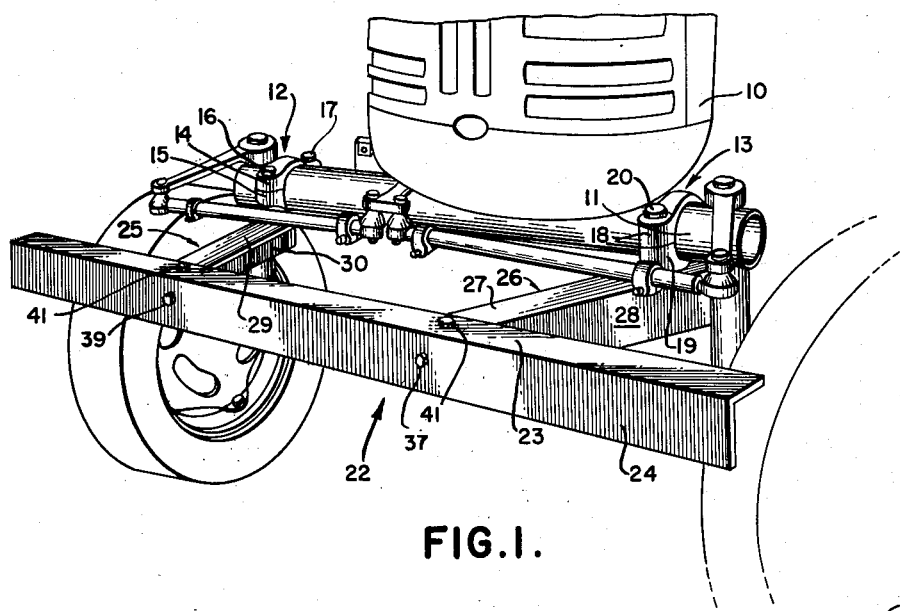
FIGURE 1 is a fragmentary perspective view of a Farmall 100-type tractor having the bumper assembly of the present invention installed thereon.
Figure 2:
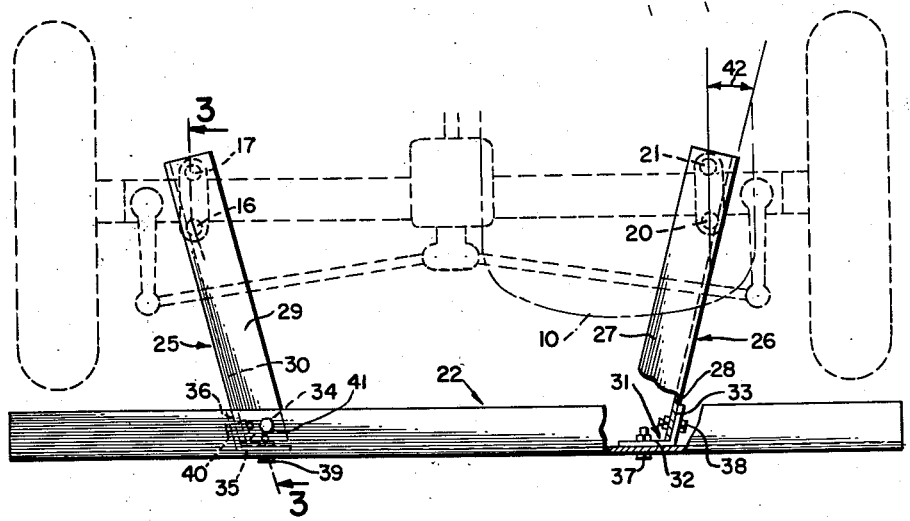
FIGURE 2 is a top plan view with parts broken away and parts shown in dotted line of the bumper assembly as applied to the front end of the tractor of FIGURE 1.
Figure 3:
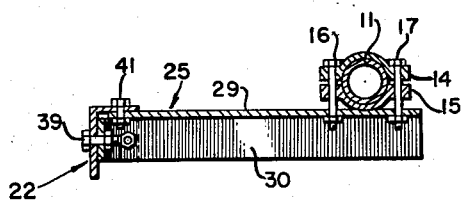
FIGURE 3 is a vertical section taken on the lines 3—3 of FIGURE 2.

Referring more particularly to the drawings, 10 designates generally a Farmall-type 100 series tractor having a circular cross-sectional front axle housing 11. In this type of construction a wheel spreader member is provided for being telescopically received within the cross-sectional housing 11 and, accordingly, a pair of clamp members 12 and 13 are provided for frictionally binding or locking the axle in proper position. The clamp member 12 has an upper element 14 and a lower element 15 which are joined together and retained by bolts 16 and 17 having suitable nuts thereon. The clamp member 13 has an upper member 18 and a lower member 19 which are in a like manner to that of the member 12 retained by bolts 20 and 21.

The bumper bar is designated generally at 22 and as will be seen is of angle iron construction having a top flange 23 and a side flange 24. The bumper is mounted on a pair of bumper mount brackets 25 and 26. The mount bracket 26 has a top flange 27 and a side flange 28, while the mount bracket 25 has a top flange 29 and a side flange 30.

At the forward end of each of the bumper mount brackets 25 and 26 are situated obtuse bent angle straps 31 and 34. The strap 31 has a base leg 32 and a side leg 33, while the strap 34 has a base leg 35 and a side leg 36. The base leg 32 of strap 31 is secured to the front flange 24 of the bumper 22 by means of a bolt and nut assembly 37, while the side leg 33 is secured to the side flange 28 of the bumper mount bracket 26 by a bolt and nut assembly 38. The bumper mount bracket 25 is secured to the bumper 22 by a bolt and nut assembly 39 joining the front flange 24 of the bumper with the leg 35 of strap 34 and a bolt and nut assembly 40 joins the angle leg 36 to the side flange 30 of the bumper mount bracket 25.

The top flange 23 of the bumper 22 is bolted to the top flanges 27 and 29 of the bumper mount brackets 26 and 25 respectively by a bolt and nut connection 41.

A pair of spacer members may be inserted between the top flanges 27 and 29 of the bumper mount brackets 26 and 25 and the bottom of the members 15 and 19 of the complemental clamps 12 and 13 to provide the additional rigidity for stabilizing the bumper assembly.

It will be noted that a pair of holes have been drilled through the top flanges 27 and 29 of the bumper mount brackets and that these holes have been drilled at an angle to the major axis of the top flanges 27 and 29. This angular disposition is shown at 42 and is for the purpose of providing a forwardly convergent A-frame type strengthened assembly capable of withstanding greater shock without damage to the tractor.

It will also be appreciated that since all connections are bolt and nut connections, that the bumper 22 and mount brackets 25 and 26 can be shipped in a knockdown compact nested condition and that each farmer purchasing such a kit for addition to his tractor can readily assemble the same in a minimum of time with a minimum of tools and that the services of a welder or other particular form of joining device is not necessary.

Although I have disclosed herein the best form of the invention known to me at this time, I reserve the right to all such modifications and changes as may come within the scope of the following claim.

What I claim is:

For use with a tractor; having a substantially circular cross section front axle housing, having a pair of complemental clamp members embracing the housing and bolts to retain the clamp members in place on the housing; a detachable knockdown bumper assembly, comprising: a pair of bumper mount angle iron support members detachably secured to a bumper bar adjacent their forward ends, each of said support members being straight throughout their entire length and having a top horizontal flange and a side vertical flange, said top horizontal flange having adjacent its rear end a pair of openings therethrough adapted to receive therethrough the clamp member bolts, one opening of each pair of openings being disposed on one side of the longitudinal center line of its top horizontal flange and the other opening being disposed on the opposite side of its said center line so that when the openings in the support members are brought into registry with the clamp member bolts the support members will forwardly converge to provide with the bumper bar a forwardly convergent A-frame with the support members constituting straight legs of the A-frame throughout their entire length including their rear end portions which are attached to the clamp members, said A-frame construction lying substantially flat and within the vertical height of the bumper bar, and means to secure each support member to the bumper bar including a metal strap having a base leg and a side leg disposed at an obtuse angle to one another, each of said legs having an opening therethrough adapted to receive the securing means through each opening to secure the strap to the bumper bar and to the support members.

References Cited in the file of this patent

UNITED STATES PATENTS

| | | |
|---|---|---|
| 864,897 | Jones | Sept. 3, 1907 |
| 1,384,520 | Ditson | July 12, 1921 |
| 1,499,169 | Gill | June 24, 1924 |
| 1,595,391 | Fageol | Aug. 10, 1926 |
| 2,252,579 | Rosen | Aug. 12, 1941 |
| 2,438,578 | Runyan | Mar. 30, 1948 |
| 2,632,533 | MacKenzie | Mar. 24, 1953 |
| 2,639,933 | Meyer et al. | May 26, 1953 |
| 2,646,303 | Ferrell | July 21, 1953 |
| 2,733,786 | Drake | Feb. 7, 1956 |
| 2,889,016 | Warren | June 2, 1959 |
| 2,906,380 | Sanders | Sept. 29, 1959 |